E. E. NOVOTNY.
PRINTING PLATE MATRIX AND METHOD OF MAKING SAME.
APPLICATION FILED DEC. 18, 1919.
1,398,142. Patented Nov. 22, 1921.
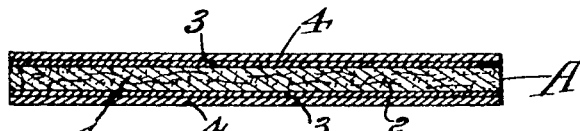
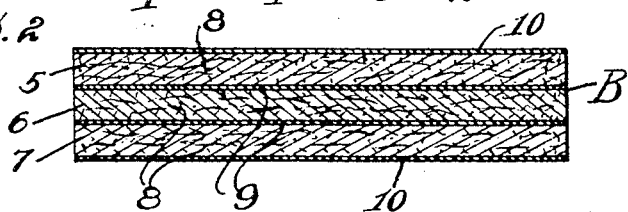
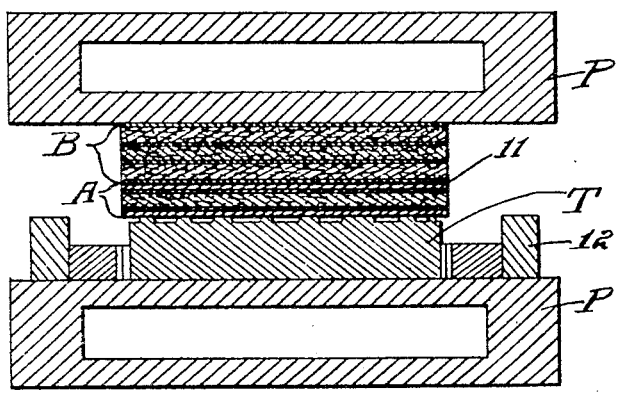
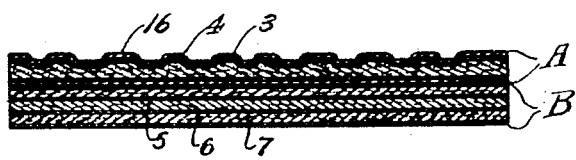
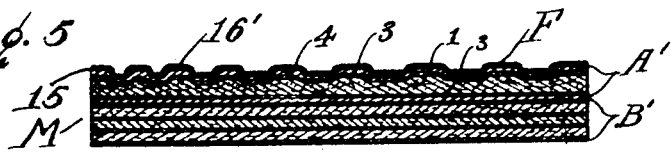
Inventor
Emil E Novotny
By his Attorneys
Meyers, Cushman & Rea

UNITED STATES PATENT OFFICE.

EMIL E. NOVOTNY, OF LOGAN, PENNSYLVANIA, ASSIGNOR TO JOHN STOGDELL STOKES, OF PHILADELPHIA, PENNSYLVANIA.

PRINTING-PLATE MATRIX AND METHOD OF MAKING SAME.

1,398,142.      Specification of Letters Patent.      Patented Nov. 22, 1921.

Application filed December 18, 1919. Serial No. 345,809.

*To all whom it may concern:*

Be it known that I, EMIL E. NOVOTNY, a citizen of the United States, and resident of Logan, in the county of Philadelphia and State of Pennsylvania, have invented certain new and useful Improvements in Printing-Plate Matrices and Methods of Making Same, of which the following is a specification.

This invention relates to a printing plate matrix and method of making the same, and has particular application to a matrix adapted for the molding of printing plates made in whole or in part from plastic or cementitious materials, especially such synthetic resins as bakelite, condensite or other phenolic condensation product.

The use of phenolic condensation products has been found to be particularly advantageous for the production of strong, durable, high grade printing plates and matrices therefor, because this material may be readily molded with the greatest exactitude to produce an article of the desired shape, form and dimension, and during or after the molding operation may, under the action of heat and pressure, or heat pressure and cooling be caused to react to assume a hardened and set and practically unchangeable condition. However it is difficult, especially in the manufacture or reproduction of fine work, where the type or plate constituting the original from which the matrix is made embody small fine type, or intricate designs, to make a matrix having the phenolic material as an essential constituent, or to make a phenolic plate from such a phenolic matrix, because in making the matrix from the original body of type the phenolic material has a tendency to anchor or stick to the original type body so that it cannot be separated or removed therefrom without destroying the molding face of the matrix, while in attempting to mold a phenolic plate against a phenolic matrix, the affinity of the phenolic material of the plate for that of the matrix will cause the same difficulty of sticking or anchoring, resulting in the inability to separate the plate and the matrix without destroying one or both.

Apart from such disadvantage however these phenolic condensation products form ideal constituents in making matrices and plates because, as is well known, in modern printing, especially on large jobs, the tendency is to make a great many plates or replicas of an original, and frequently this original will be a combination of various kinds of type, brass rules, half tones and the like, set up in a printer's chase. As the phenolic material is readily molded, it will faithfully reproduce the elevations and depressions, and the details of the original, and the matrix being made may be molded to definite dimensions. However in molding the matrix the material will have a tendency to flow toward or seek points of least resistance, that is where there is little direct pressure of the material against the original, and will also reproduce any roughness or defect in the original. In making a phenolic printing plate against a paper faced matrix there will be reproduced on the face of the plate the slightest roughness, of the matrix face such as that caused by the web or paper finish appearing on the material of the matrix face. I have attempted to remove the anchor points, rough spots and other defects produced on the face of the matrix, and also on the face of the plate by employing high speed buffing tools, but the roughening or other defect usually occurs in such inaccessible places, for example in the space between the type characters that it is commercially impracticable to so remedy the deficiencies. I have also resorted to the use of solvents for eliminating the defects, but as these solvents will attack the face of the article, and as the phenolic condensation product of the article has set to a more or less infusible form, this method I have found to be unsatisfactory.

To obviate defects in the making of a matrix from original type, and the subsequent molding of plates from this matrix I have heretofore faced the matrix body, composed of phenolic material, or phenolic material in combination with other substances, such as fiber, with a layer or sheet of metallic material, such as metal foil. This metal face had reproduced therein the type characters of the original to form the molding face, and this type of matrix has been so satisfactory that I have been able to produce vast quantities of commercially useful phenolic printing plates. Heretofore, however, I have used a relatively heavy or thick foil for the purpose of getting the necessary surface flow or tension of the foil face to produce the swelled or rounded elevations and depressions in the molding face of the matrix, for the purpose set forth in my co-pending application Serial No. 98,905, filed May 20th, 1916, and also to eliminate the possibility of the type cutting through the foil face of the matrix, which would make openings through which the phenolic material of the plate would seep or flow thereby uniting with the phenolic substance of the matrix causing a sticking or anchoring of the plate and matrix thereby incurring the disadvantages heretofore mentioned. I have found however that the use of a heavy foil for facing the matrix is liable under the molding pressure to break down or damage fine type, hair line rules, overhung italics and the like. My investigations reveal that the ideal matrix, particularly for fine work with delicate type, should have a facing in the nature of a layer of skin-like smoothness with rounded or swelled non-printing parts, and which could be so treated that the matrix would not anchor to the original type, nor the plate to the matrix.

One of the principal objects of my invention, therefore, is the production of a strong, durable and accurate matrix having a molding face in the nature of a hard, smooth, skin-like cementitious substance, such face being preferably formed from a synthetic resin such as a phenolic condensation product. If desired, I may cover this face with an exceedingly thin sheet of metal, such as foil. but this is not absolutely necessary.

My invention consists in the matrix and the method of making the same set forth in the falling within the scope of the appended claims.

In the accompanying drawing:

Figure 1, is a cross sectional view taken through the face section of a blank from which the matrix is to be made.

Fig. 2, is a similar view taken through the backing section of such a blank.

Fig. 3, is a cross sectional view showing the face and backing sections assembled in a press and upon a body of type, ready for making the matrix, the press and type being merely conventionally illustrated.

Fig. 4, is a cross sectional view through the completed matrix.

Fig. 5, is a cross sectional view through a modified form of matrix wherein the face of the matrix is provided with a metallic foil surface.

Where I herein use the term "phenolic condensation varnish," or "phenolic material," or similar expressions, I wish it to be understood as including any cementitious products possessing the attributes or characteristics heretofore mentioned.

Referring now to Figs. 1 to 4 of the drawing, and particularly to Figs. 1 and 2, the letter A in Fig. 1 indicates as an entirety a blank from which the face section of the matrix is to be made. This blank includes a sheet 1 of fibrous material, such as chip board or blotting paper, or other porous material which is impregnated, but not saturated fully with a phenolic condensation varnish shown at 2 the varnish having been dried out in any suitable manner so that the phenolic material, which constitutes about sixty per cent. in weight of the fiber board, is in a substantially non-flowing condition and acts to reinforce and strengthen the fiber sheet or board. This impregnated fiber sheet is coated on both sides with layers of phenolic material, shown at 3, the material of these coatings 3 comprising a mixture of substantially equal parts of phenolic varnish and lamp black, the coatings having also been dried out, by the elimination of the solvent until they are substantially dry. These coatings 3 are in turn covered with coating or layers 4, also of phenolic material, but what might be called a richer grade or mixture, for the coatings 4 may be of a mixture of four parts of phenolic varnish, one part of lamp black, and about one-half part of a phenolic solid solvent, or plasticity oil of any well known variety. These coatings 4 have also been heated to eliminate the solvents and are in a partially reacted or hardened condition but still capable of being softened and molded under heat and pressure. The coatings 3 are employed between the coatings 4 and the impregnated fiber sheet to prevent the material of the coatings 4 from penetrating or soaking into the fiber. The impregnated fiber coated sheet A is squeezed or pressed against a polished copper sheet between the platens of a cold press with a pressure of about two thousand pounds to the square inch for about one minute to thoroughly compact the various coatings. Then the compacted blank, resting on the copper sheet is placed in a heated press and subjected to a pressure of about two hundred pounds to a square inch for about five minutes at a temperature of about 212 degrees F. to convert the coatings or layers 4 into highly polished, smooth, skin-like faces. This constitutes the blank shown in Fig. 1.

The backing for the face section A is illustrated in Fig. 2. It comprises a plurality of laminations or fiber sheets, in the present instance three in number, shown at 5, 6 and 7, which are also impregnated to a slight degree with a phenolic material as indicated at 8, the phenolic material at the time of impregnation being in the nature of a phenolic varnish constituting about twenty per cent. of the weight of the fiber, and which is subsequently dried out by the elimination of the solvents so that the phenolic gum remaining is substantially in a non-flowing condition and strengthens and reinforces the fiber. These fibrous laminations or sheets are cemented together by a suitable adhesive as shown at 9, a phenolic varnish being preferably employed, and the faces of the laminated sheets are coated as shown at 10 with a phenolic material preferably composed of equal parts lamp black and phenol, these coatings 10 of course being also dried out. This backing sheet, which is indicated as an entirety by the letter B, is then placed in an oven and heated at a temperature of about 250 degrees F. for one hour, to harden and set the phenolic material. This will cause the fiber of the laminated backing to expand somewhat, and it may be subsequently compressed for making the matrix, and due to the phenol impregnated therein will maintain its compressed condition, as will be readily understood.

The face section A and the backing section B may now be cemented together by a suitable adhesive to form a single blank, or may be supplied to the matrix maker separately, the union taking place in making the matrix. These sheets may be shipped from place to place, or stored indefinitely, as they are not affected by climatic conditions.

In making a matrix the original to be reproduced, such as a body of type, etchings, or the like, locked in a chase, and conventionally shown at T, may be placed upon the lower platen of a suitable press P, the platens of the press being hollow so as to be heated and cooled in the usual manner, the press platens being herein merely conventionally shown. The facing section A of the blank is placed with one of its faces 4 in direct contact with the type, and upon this section A I may then sprinkle a free-flowing phenolic gum to a thickness of from five to fifteen one thousandths of an inch, as indicated by the numeral 11, in Fig. 3. I then impose the backing section B upon the face section A, and the platens of the press are closed to apply heat and pressure, the closing of the platens being limited by suitable bearers 12. The press platens are slowly closed against the bearers to allow the sprinkled layer of phenol, shown at 11, to soften and flow to the elevations or non-printing parts of the matrix, produced in the molding operation. That is to say the phenolic gum flows to the points of least pressure which are the unsupported parts of the matrix or the elevations which produce the non-printing portions of the printing plate. The press may be kept closed, at a temperature of 212 degrees F. for a period of from three to fifteen minutes, depending on the degree of hardness desired for the matrix and also on the quickness with which the phenolic material in the matrix body will set. When the press is opened and the matrix removed from the type it will be found that the original type matter has been accurately reproduced with the greatest detail, and that no difficulty whatever is experienced in removing the matrix from the type, as it will not stick. Indeed, the matrix can be stripped from the type even when the latter contains type matter having overhung characters and the like. After the matrix has been removed from the typeform against which it has been molded at the relatively low temperature above mentioned, it is again heated in an oven, or through any other suitable agency, to convert the phenolic material to its final hard and set infusible form, this final heating being accomplished at temperatures ranging from 250 to 300 degrees F. It is to be understood that the matrix was not subjected, while on the type, to a sufficient high temperature to render the phenolic material infusible, because such high temperature would expand and damage the type. Therefore, the matrix was heated while on the type, at a low temperature, or just sufficient to insure proper impression or molding, and the matrix could be removed without sticking to the type because of the pre-cooked or skin-like nature of the face 4 in contact with the type, as this face will not soften at this low temperature sufficiently to adhere to the type. Of course, the final cooking or heating of the matrix at the high temperature gives such matrix its final rigid form.

In Fig. 5, I have shown a slightly modified form of my invention wherein the matrix body which is indicated as an entirety by the letter M, and which is made of the united face sections A', and the back sections B', is faced with a metallic foil F, which is exceedingly thin, preferably of a thickness of about one thousandths of an inch. The backing B' is similar to the backing B of Fig. 2, and the face section A' is similar to the face section A of Fig. 1, except that in the place of the top layer 4, I substitute a layer composed of one part of phenol gum and four parts of barium sulfate, as shown at 15, to insure that the foil will adhere to the face section, and at the same time this layer 15 acts to support the foil.

In casting a printing plate against either the matrix shown in Fig. 4, or the foil face matrix of Fig. 5, I prefer to coat the face of the matrix with a medium composed of soft, fine graphite mixed with a dextrin solution diluted to a suitable thinness. Such a coating is shown at 16 in Fig. 4 and 16' in Fig. 5. The dextrin gives the graphite the footing or adherence necessary to cause it to stick temporarily to the face of the matrix in the form of a smooth imperforate layer. In actual use when casting the plate it is only necessary to brush a small quantity of the separating medium upon the matrix face and polish it smoothly with a brush so as to form a thin surface coating over those portions of the matrix face which will be in contact with the plate being cast. Owing to the exceeding thinness of the metal foil used on the matrix shown in Fig. 5, it is well to use the coating of graphite and dextrin as a separating medium, because in molding the printing plate, should the foil be cut the phenolic material of the plate is liable to seep through this cut and unite with the phenol coating beneath the foil thereby causing sticking. This, however, is prevented by using the graphite separating medium.

In making the printing plate the body of the latter may be composed of any suitable phenolic material, or a combination of such material with other substances such as fiber, fiber board and the like. The plate is molded against the matrix, under heat and pressure, and when the plate is removed from the matrix after the completion of the molding and casting operation the graphite coating will be removed from the face of the matrix, coming away with the plate, so that it is necessary to recoat the matrix with the separating medium for each plate to be made.

While I have herein shown and described the preferred embodiment of my invention I wish it to be understood that I do not confine myself to all the precise details of construction and method herein set forth by way of illustration, as modification and variation may be made without departing from the spirit of the invention or exceeding the scope of the appended claims.

What I claim is:

1. A printing plate matrix comprising a body portion, a molding face section thereon, said molding face section including a layer of hard and set synthetic resinous material imposed upon the body portion and a skin-like coating of hard and set synthetic resinous material imposed upon the aforesaid layer, said layer forming a barrier between the skin-like coating and the body portion to prevent penetration of the material of said coating into the body portion.

2. A printing plate matrix having a molding face embodying a plurality of layers of a phenolic condensation product, one of said layers containing a relatively low percentage of the phenolic condensation product while another of said layers contains a relatively high percentage of said product.

3. A printing plate matrix comprising a body portion of united long fiber sheets impregnated to a minimum degree with a hard and set synthetic resinous material, said body portion having a molding face including a plurality of layers of hard and set synthetic resinous material, said layers differing from each other in relative hardness.

4. A printing plate matrix comprising a body portion of fibrous material impregnated with a hard and set synthetic resinous material, a face section comprising a layer of hard and set synthetic resinous material and a separating coating of carbonaceous material on the molding face.

5. A printing plate matrix comprising a body portion having a hard and set synthetic resinous material incorporated therein, a face section for the body portion including a hard and set synthetic resinous material and a facing therefor composed of a sheet of relatively thin metallic foil.

6. A printing plate matrix comprising a body portion including a hard and set resinous material, and a face section for the body portion comprising a layer of hard and set synthetic resinous material, a facing of relatively thin metallic foil for said facing and a separating coating including carbonaceous material imposed on the metallic foil facing.

7. A printing plate matrix comprising a backing composed of a plurality of united sheets of fibrous material impregnated with a synthetic resin, and a face section comprising a sheet of fibrous material impregnated with a synthetic resin, the fibrous sheet of the face section having at each face a coating containing a relatively low percentage of phenolic material and a second coating containing a relatively high percentage of phenolic material, said face section being united with the back section.

8. A printing plate matrix comprising a backing composed of a plurality of united sheets of fibrous material impregnated with a synthetic resin, and a face section comprising a sheet of fibrous material impregnated with a synthetic resin, the fibrous sheet of the face section having at each face a coating containing a relatively low percentage of phenolic material and a second coating containing a relatively high percentage of phenolic material, said face section being united with the back section, and a surface facing of relatively thin metallic foil for the face section.

9. The herein described method of making a matrix which consists in impregnating a sheet of fibrous material with a synthetic resinous material, heating the same to dry out the synthetic resinous material, coating said impregneated sheet with a plurality of layers of synthetic resinous material, then heating the same to dry said layers, then imposing said sheet upon a body of type or the like and subjecting the same to heat and pressure to form the molding face of the matrix, removing said matrix from the type and subsequently heating said matrix at a relatively high temperature to harden and set the synthetic resinous material to its final infusible form.

Signed at New York city, in the county of New York and State of New York, this 6th day of December, A. D. 1919.

EMIL E. NOVOTNY.